(12) United States Patent
Docter

(10) Patent No.: US 9,354,389 B2
(45) Date of Patent: May 31, 2016

(54) INTEGRATED PHOTONIC COMPONENT AND METHOD OF DESIGNING THE SAME

(71) Applicant: EFFECT PHOTONICS, Eindhoven (NL)

(72) Inventor: Boudewijn Docter, Eindhoven (NL)

(73) Assignee: EFFECT PHOTONICS B.V., Eindhoven (NL)

( * ) Notice: Subject to any disclaimer, the term of this patent is extended or adjusted under 35 U.S.C. 154(b) by 0 days.

(21) Appl. No.: 14/778,707

(22) PCT Filed: Mar. 20, 2014

(86) PCT No.: PCT/NL2014/050170
§ 371 (c)(1),
(2) Date: Sep. 21, 2015

(87) PCT Pub. No.: WO2014/148901
PCT Pub. Date: Sep. 25, 2014

(65) Prior Publication Data
US 2016/0041337 A1    Feb. 11, 2016

(30) Foreign Application Priority Data

Mar. 20, 2013  (EP) ..................... 13160177

(51) Int. Cl.
*G02B 6/26* (2006.01)
*G02B 6/42* (2006.01)
(Continued)

(52) U.S. Cl.
CPC ........ *G02B 6/12023* (2013.01); *G02B 6/12009* (2013.01); *G02B 6/12014* (2013.01); *G02B6/12019* (2013.01); *G02B 6/2773* (2013.01); *G02B 6/2938* (2013.01); *G02B 6/29302* (2013.01); *G02B 6/29344* (2013.01); *G02B 6/29352* (2013.01); *G02B 6/29395* (2013.01)

(58) Field of Classification Search
CPC ........... G02B 6/12009; G02B 6/12014; G02B 6/12019; G02B 6/12023; G02B 6/2773; G02B 6/29352; G02B 6/29302; G02B 6/29395; G02B 6/29344; G02B 6/2938
USPC ..................................... 385/1, 32, 37, 39, 50
See application file for complete search history.

(56) References Cited

U.S. PATENT DOCUMENTS

| | | | | |
|---|---|---|---|---|
| 5,546,483 A | * | 8/1996 | Inoue ................. | G01M 11/3136 385/131 |
| 5,809,184 A | * | 9/1998 | Doerr ................. | G02B 6/12016 385/11 |

(Continued)

FOREIGN PATENT DOCUMENTS

EP    1 426 800 A2    6/2004
JP    H04 163406 A    6/1992

OTHER PUBLICATIONS

Smit M K et al.: "Phasar-Based WDM-Devices Principles, Design and Applications", IEEE Journal of Selected Topics in Quantum Electronics, IEEE Service Center, Piscataway, NJ, us, vol. 2, No. 2, Jun. 1, 1996, pp. 236-250, XP000685236, ISSN: 1077-260X, DOI: 10.1109/2944.577370 figure 8.

(Continued)

*Primary Examiner* — Ryan Lepisto
(74) *Attorney, Agent, or Firm* — Young & Thompson

(57) ABSTRACT

An integrated photonic component (100) for polarization insensitive wavelength multiplexing includes an arrayed waveguide grating, AWG, (1) having a predetermined polarization splitting and a MZI-based polarization beam splitter (8) that is configured to compensate the predetermined polarization splitting of the AWG (1). The result is a fabrication tolerant integrated photonic component (100) that is operable over a wide number of limited bandwidth wavelength channels of a wavelength division multiplexing, WDM, system. A photonic integrated circuit, PIC, (200) for use in a WDM system is provided. The PIC (200) includes the integrated photonic component (100). A method of designing the integrated photonic component (100) is also described.

20 Claims, 12 Drawing Sheets

(51) Int. Cl.
*G02B 6/12* (2006.01)
*G02B 6/293* (2006.01)
*G02B 6/27* (2006.01)

(56) References Cited

U.S. PATENT DOCUMENTS

2004/0136647 A1* 7/2004 Mizuno .............. G02B 6/12007
385/24

2009/0214150 A1* 8/2009 Doerr ..................... B82Y 20/00
385/3
2010/0322629 A1* 12/2010 Nagarajan .......... G02B 6/12004
398/65
2014/0064729 A1* 3/2014 Assefa ............... G02B 6/12023
398/65

OTHER PUBLICATIONS

International Search Report, dated Jun. 12, 2014, from corresponding PCT application.

* cited by examiner

INTEGRATED PHOTONIC COMPONENT AND METHOD OF DESIGNING THE SAME

FIELD OF THE INVENTION

The present invention relates to an integrated photonic component for polarization insensitive wavelength multiplexing comprising an arrayed waveguide grating, AWG, having a predetermined polarization splitting and a MZI-based polarization beam splitter that is configured to compensate the predetermined polarization splitting of the AWG. The result is a fabrication tolerant integrated photonic component that is operable over a wide number of limited bandwidth wavelength channels of a wavelength division multiplexing, WDM, system. The invention further relates to a photonic integrated circuit, PIC, for use in a WDM system, the PIC comprising the integrated photonic component set forth. The invention also relates to a method of designing the integrated photonic component set forth.

BACKGROUND OF THE INVENTION

Wavelength multiplexers are key building blocks for WDM communication networks that use multiple wavelengths on a single optical fiber. Integrating the wavelength multiplexer with either transmitters or receivers on a single chip allows cost saving and leads to smaller components.

The most commonly used building block to realize such a multiplexer is an arrayed waveguide grating (AWG). The basic layout of an AWG is schematically shown in FIG. 1 that is taken from a prior art document by M. K. Smit and C. van Dam, "PHASAR-Based WDM-Devices: Principles, Design and Applications", IEEE J. of Sel. Top. In Quant. Electr., Vol. 2, No. 2, June 1996.

FIG. 1 shows that the AWG 1 has an input slab region or input free propagation range (FPR) 2 and an output slab region or output FPR 3 that are in optical communication by an array of waveguides 4 having a length increment from one waveguide to the next. Furthermore, the blow up in FIG. 1 schematically shows the arrangement of the waveguides of the array of waveguides 4 at the input section of the output FPR 3 of the AWG 1.

Furthermore, it can be seen from FIG. 1 that the output slab 3 region of the AWG 1 is also in optical communication with a plurality of output waveguides 5, whereas the input slab region 2 is also in optical communication with a first input waveguide for receiving a WDM optical input signal. The AWG 1 further has a central channel wavelength, $\lambda_c$, and a number of channels that are spaced apart by a channel spacing, $\Delta\lambda_{AWG}$.

Only when the waveguides 4, 5, 6 that compose the AWG 1 are perfectly polarization insensitive, which means that for the two main polarization states, i.e. transverse electric (TE) and transverse magnetic (TM), the effective mode indices are exactly the same, i.e. $N_{eff,TE}=N_{eff,TM}$, the transmission response is reasonably similar for both these polarization states. In the case that $N_{eff,TE} \neq N_{eff,TM}$, the waveguides are said to be birefringent. As a result thereof, the AWG 1 has a different transmission response for different TE and TM polarized input light.

Known polarization insensitive wavelength multiplexers comprise stand alone AWG components that are usually made in silica technology that enables the waveguides of the stand alone AWG to be made polarization insensitive with reasonable fabrication tolerance. However, the silica platform is not very suitable for densely integrated circuits on chip as it is not possible to monolithically integrate transmitters, receivers and/or modulators in the same platform. Therefore, the use of the silica platform is disadvantageous because of the rather bulky stand alone components and the required hybrid integration thereof. This results in higher complexity and costs of systems fabricated using this technology.

There are several material systems that are more suitable than the silica platform to establish smaller components and easier integration thereof into complex systems such as multi-wavelength transmitters and receivers. Examples are the known Indium Phosphide (InP) system and the Silicon On Insulator (SOI) platform. A drawback of using these known material systems is that the standard waveguide types in both these material systems have substantially different effective mode indices for the two polarization states. This results in a shift of the wavelength response between the two polarizations TE and TM. This is called polarization splitting, polarization dispersion or polarization dependent wavelength shift (PDWS). The relative PDWS ($\Delta\lambda/\lambda$) is equal to the relative mode index difference ($\Delta N_{eff}/N_{eff}$):

$$\frac{\Delta\lambda}{\lambda} = \frac{\Delta N_{eff}}{N_{eff}} \qquad \text{Eq. 1}$$

FIG. 2a schematically shows different orders of TE and TM polarized light, i.e. $TE_m$, $TE_{m-1}$, $TM_m$, and $TM_{m-1}$, that exit the waveguides of the array of waveguides 4 that are arranged at a first side of the output slab region 3 of the AWG 1 are projected on the output waveguides 5 that are arranged at the opposite side of the output slab region 3 of the AWG 1.

FIG. 2b schematically shows a spectral distribution of the different orders of the TE and TM polarized light, i.e. $TE_m$, $TE_{m-1}$, $TM_m$, $TM_{m-1}$. From this spectral distribution the polarization dispersion (pd) and the Free Spectral Range (FSR) can be determined.

From the above mentioned prior art document by M. K. Smit and C. van Dam, an approach is known for making an AWG polarization independent. In this approach two separate inputs for the two polarization states, i.e. TE and TM, are used as is schematically shown in FIG. 5. In this case, the input slab region 2 of the AWG 1 is further in optical communication with a second input waveguide 7. The first input waveguide 6 is provided with TE polarized light from the optical input signal, whereas the second input waveguide 7 is provided with TM polarized light from the optical input signal.

The first 6 and second 7 input waveguides are arranged relative to the input slab region 2 at a first and a second position. These first and second positions are matched to the polarization dispersion caused by the birefringence of the waveguides of the array of waveguides 4 of the AWG 1.

In the known approach mentioned above, a polarization beam splitter 8 for splitting the TE and TM polarization states of the optical input signal is required in combination with the birefringent AWG 1.

Integrated polarization beam splitters are known from Y. Hashizume et al., "Integrated Polarisation Beam Splitter using Waveguide Birefringence Dependence of Waveguide Core Width", Electr. Lett. Vol. 37, No. 25, December 2001, and from US Patent Application 2009/0214150A1.

The integrated polarization beam splitter known from Y. Hashizume et al. has a disadvantage in that it is silica-based and therefore not suitable for monolithic integration with transmitters, receivers and/or modulators. Although the disclosed polarization beam splitter would be suitable for a WDM system because of its broad bandwidth, it has another disadvantage in that its performance is very sensitive to deviations in the fabrication process as its polarization splitting response is substantially determined by a difference in birefringence between the two arms of the Mach-Zehnder Interferometer-based polarization beam splitter.

Although US 2009/0214150A1 discloses a polarization beam splitter that is integrated using the InP material system, a disadvantage of this polarization beam splitter is that it is not suitable for use in a wavelength multiplexer for a WDM system because of its very narrow bandwidth that would only allow it to be used for one channel of the WDM system.

SUMMARY OF THE INVENTION

It is an object of the present invention to provide an integrated photonic component for polarization insensitive wavelength multiplexing, wherein such a component is suitable for application in a WDM system and furthermore has an improved fabrication tolerance. It is also an object of the invention to provide a photonic integrated circuit (PIC) for use in a WDM system comprising the component according to the invention. Furthermore, it is an object of the invention to provide a method of designing the integrated photonic component according to the invention.

In an embodiment of the integrated photonic component according to the invention, the component comprises an arrayed waveguide grating, AWG, having an input slab region and an output slab region that are in optical communication by an array of birefringent waveguides, the waveguides of said array of waveguides having a length increment from one waveguide to the next, the output slab region further being in optical communication with a plurality of output waveguides, the input slab region further being in optical communication with at least a first input waveguide and a second input waveguide, said first and second input waveguides being arranged relative to the input slab region at a first and a second position, said first and second positions being matched to the polarization dispersion caused by the birefringence of the waveguides of the array of waveguides, the AWG further having a central channel wavelength, $\lambda_c$, and a number of channels being spaced apart by a channel spacing, $\Delta\lambda_{AWG}$; and a polarization beam splitter comprising a first output waveguide and a second output waveguide, said first and second output waveguides being in optical communication with the first and second input waveguides arranged at the input slab region of the AWG, the polarization beam splitter further comprising a birefringent Mach-Zehnder interferometer, MZI, for splitting an optical input signal into a transverse electric, TE, polarized optical signal and a transverse magnetic, TM, polarized optical signal, the TE polarized optical signal being provided to the first input waveguide arranged at the input slab region of the AWG via the first output waveguide of the polarization beam splitter, and the TM polarized optical signal being provided to the second input waveguide arranged at the input slab region of the AWG via the second output waveguide of the polarization beam splitter, the MZI being configured to have a polarization splitting response that is a periodic function of wavelength of the optical input signal, said polarization splitting response having multiple passbands, wherein the MZI has a free spectral range, FSR, that is matched to the channel spacing of the AWG, $\Delta\lambda_{AWG}$.

The integrated photonic component according to the invention has an improved fabrication tolerance because of the use of the MZI-based polarization beam splitter that is configured to compensate the polarization splitting of the birefringent AWG. Furthermore, the component according to the invention is suitable for use in a WDM system as a result of the matching of the FSR of the MZI to the channel spacing of the AWG. As a result, the integrated photonic component is operable over a wide number of limited bandwidth wavelength channels of the WDM system.

In an embodiment of the integrated photonic component according to the invention, the polarization splitting response is a sinusoidal function of wavelength of the optical signal, e.g. a raised cosine, raised sine, or a sine squared.

In an embodiment of the integrated photonic component according to the invention, the component is monolithically integrated on a semiconductor substrate comprising at least one of Indium Phosphide-based material and Silicon-based material, more particularly Silicon On Insulator. In this way transmitters, receivers and/or modulators can be integrated on the same semiconductor substrate allowing smaller components and therefore cost savings.

In an embodiment of the integrated photonic component according to the invention, the AWG and the polarization beam splitter have waveguides comprising at least one of Indium Phosphide, InP, Indium Gallium Arsenide Phosphide, InGaAsP, and Indium Aluminum Gallium Arsenide, InAlGaAs. These material systems are best suited for fabrication components and circuits for use in optical WDM systems.

In an embodiment of the integrated photonic component according to the invention, the component comprises at least one of Indium Phosphide, InP, Indium Gallium Arsenide Phosphide, InGaAsP, and Indium Aluminum Gallium Arsenide, InAlGaAs.

An aspect of the invention is a photonic integrated circuit, PIC, for optical communication comprising the integrated photonic component according to the invention. Such a PIC has polarization insensitive wavelength multiplexing capability for use in a WDM system. Furthermore, such a PIC has improved fabrication tolerance at least for the component according to the invention.

An aspect of the invention is a method of designing an integrated photonic component for polarization insensitive wavelength multiplexing comprising the steps of:

providing an arrayed waveguide grating, AWG, having an input slab region and an output slab region that are in optical communication by an array of birefringent waveguides, the waveguides of said array of waveguides having a length increment from one waveguide to the next, the output slab region further being in optical communication with a plurality of output waveguides, the input slab region further being in optical communication with at least a first input waveguide and a second input waveguide, said first and second input waveguides being arranged relative to the input slab region at a first and a second position, said first and second positions being matched to the polarization dispersion caused by the birefringence of the waveguides of the array of waveguides, the AWG further having a central channel wavelength, $\lambda_c$, and a number of channels being spaced apart by a channel spacing, $\Delta\lambda_{AWG}$;

providing a polarization beam splitter comprising a first output waveguide and a second output waveguide, said first and second output waveguides being in optical communication with the first and second input waveguides arranged at the input slab region of the AWG, the polarization beam splitter further comprising a birefringent Mach-Zehnder interferometer, MZI, for splitting an optical input signal into a transverse electric, TE, polarized optical signal and a transverse magnetic, TM, polarized optical signal, the TE polarized optical signal being provided to the first input waveguide arranged at the input slab region of the AWG via the first output waveguide of the polarization beam splitter, and the TM polarized optical signal being provided to the second input waveguide arranged at the input slab region of the AWG via the second output waveguide of the polarization beam splitter;

configuring the MZI to have a polarization splitting response that is a periodic function of wavelength of the optical input signal, said polarization splitting response having multiple passbands; and configuring the MZI to have a free spectral range, FSR, that is matched to the channel spacing of the AWG, $\Delta\lambda_{AWG}$.

This method provides an integrated photonic component according to the invention that has an improved fabrication tolerance because of the use of the MZI-based polarization beam splitter that is configured to compensate the polarization splitting of the birefringent AWG. Furthermore, the component according to the invention is suitable for use in a WDM system as a result of the matching of the FSR of the MZI to the channel spacing of the AWG. As a result, the integrated photonic component is operable over a wide number of limited bandwidth wavelength channels of the WDM system.

In an embodiment of the method according to the invention, the step of configuring the MZI to have a polarization splitting response that is a periodic function of wavelength of the optical input signal further comprises the steps of:

providing the MZI with a first waveguide arm having a first effective mode index, $N_{eff,1}$, and a first length, $L_1$, defining a first optical path, $N_{eff}L_1$, and a first birefringence, $\Delta N_{eff,TE-TM,1}$;

providing a second waveguide arm having a second effective mode index, $N_{eff,2}$, and a second length, $L_2$, defining a second optical path, $N_{eff}L_2$, and a second birefringence, $\Delta N_{eff,TE-TM,2}$, wherein the first and second optical paths are different;

providing the polarization beam splitter with a first input waveguide, $I_1$, a second input waveguide, $I_2$, a first output waveguide, $O_1$, and a second output waveguide, $O_2$;

providing a first coupling element for establishing optical communication between the first and the second input waveguides and the first and the second waveguide arms of the MZI;

providing a second coupling element for establishing optical communication between the first and the second output waveguides and the first and the second waveguide arms of the MZI;

calculating the polarization splitting response of the polarization beam splitter that is a periodic function of the wavelength of the optical input signal under the assumption that the first and the second coupling elements have a coupling ratio of 50%, is given by the equations:

$$\frac{O_1}{I_1} = \sin^2\left(\frac{\pi\Delta(N_{eff}L)}{\lambda}\right)$$

$$\frac{O_2}{I_1} = \cos^2\left(\frac{\pi\Delta(N_{eff}L)}{\lambda}\right)$$

in which equations $\lambda$ is the wavelength of the optical input signal, and $\Delta(N_{eff}L)$ is the optical path difference between the first and the second waveguide arms of the MZI;

providing an optical path difference between the first and the second waveguide arms of the MZI for the TE polarized optical signal, $\Delta(N_{eff,TE}L)$, and an optical path difference between the first and the second waveguide arms of the MZI for the TM polarized optical signal, $\Delta(N_{eff,TM}L)$, must satisfy the equations:

$$\Delta(N_{eff,TE}L) = n\lambda$$

$$\Delta(N_{eff,TM}L) = (m+\tfrac{1}{2})\lambda$$

in which equations, n and m are integers, and $\lambda$ is the wavelength of the optical input signal.

In an embodiment of the method according to the invention, the step of configuring the MZI to have a polarization splitting response that is a periodic function of wavelength of the optical input signal further comprises the steps of:

configuring the first and second waveguide arms of the MZI such that the first and second birefringences are substantially the same;

providing a length difference $\Delta L = L_1 - L_2$, to one of the first waveguide arm and the second waveguide arm; and calculating the length difference, $\Delta L$, using the equation:

$$\Delta L = \left(p + \frac{1}{2}\right)\frac{\lambda^2}{n_g \Delta\lambda} = \left(p + \frac{1}{2}\right)\frac{\lambda}{\Delta N_{eff,TE-TM}}$$

in which equation, $p = n - m$ is an integer, $n_g$ is the group index ($n_g = N_{eff} - \lambda dN_{eff}/d\lambda$), $\Delta\lambda$ is the polarization dispersion ($\Delta\lambda = \lambda\Delta N_{eff}/N_{eff}$), and $\Delta N_{eff,TE-TM}$ is the birefringence ($\Delta N_{eff,TE-TM} = N_{eff,TE} - N_{eff,TM}$).

In an embodiment of the method according to the invention, the step of matching the FSR of the MZI to the channel spacing of the AWG, $\Delta\lambda_{AWG}$, further comprises the step of calculating the length difference between the first and the second waveguide arms of the MZI, $\Delta L$, using the equation:

$$\Delta L = \Delta L_{match} = \frac{\lambda_c^2}{n_g \Delta\lambda_{AWG}}$$

in which equation, $\lambda_c$ is the central channel wavelength of the AWG.

In an embodiment of the method according to the invention, the method comprises the step of calculating the first birefringence of the first waveguide arm of the MZI, $\Delta N_{eff,TE-TM,1}$, and the second birefringence of the second waveguide arm of the MZI, $\Delta N_{eff,TE-TM,2}$, that are substantially the same, using the equation:

$$\Delta N_{eff,TE-TM} = \left(p + \frac{1}{2}\right)\frac{\lambda_c}{\Delta L_{match}}$$

in which equation, p is an integer.

In an embodiment of the method according to the invention, the method comprises the step of choosing the integer p such that the waveguides of the AWG and the polarization beam splitter have a width, W, of at least 2 micrometer. Choosing a waveguide width of at least 2 μm has the advantage that the polarization splitting as a result of deviations in the fabrication process is less severe than in the case of waveguide widths that are smaller than 2 μm.

In an embodiment of the method according to the invention, the method further comprises the steps of:

providing each of the first and second waveguide arms of the MZI with at least one waveguide section;

providing the length difference, ΔL, to one of said at least one waveguide sections of the first or the second waveguide arms.

In an embodiment of the method according to the invention, the method further comprises the steps of:

providing the first waveguide arm of the MZI with at least a first and a second waveguide section, said at least first waveguide section having a third birefringence, $\Delta N_{eff,TE-TM,3}$, a third length, $L_3$, a first width, $W_1$, and a first height, $H_1$, and said at least second waveguide section having a fourth birefringence, $\Delta N_{eff,TE-TM,4}$, a fourth length, $L_4$, a second width, $W_2$, and a second height, $H_2$; and configuring at least one of the first width and the first height to be unequal to at least one of the second width and the second height such that the third birefringence and the fourth birefringence are unequal.

In an embodiment of the method according to the invention, the method further comprises the steps of:

providing the second waveguide arm of the MZI with at least a third and a fourth waveguide section, said at least third waveguide section having a fifth birefringence, $\Delta N_{eff,TE-TM,5}$, a fifth length, $L_5$, a third width, $W_3$, and a third height, $H_3$, and said at least fourth waveguide section having a sixth birefringence, $\Delta N_{eff,TE-TM,6}$, a sixth length, $L_6$, a fourth width, $W_4$, and a fourth height, $H_4$; and configuring at least one of the third width and the third height to be unequal to at least one of the fourth width and the fourth height such that the fifth birefringence and the sixth birefringence are unequal.

In an embodiment of the method according to the invention, the method further comprises the steps of:

configuring the first and the third waveguide sections such that the third and the fifth birefringences have a same first value; and configuring the second and the fourth waveguide sections such that the fourth and the sixth birefringences have a same second value, wherein the first and second values are unequal.

In an embodiment of the method according to the invention, the method further comprises the steps of:

dividing the length difference, $\Delta L = L_1 - L_2$, into at least a first part, $\Delta L_1$, and a second part, $\Delta L_2$;

either providing said at least first part, $\Delta L_1$, to said at least first waveguide section and said at least second part, $\Delta L_2$, to said at least second waveguide section of the first waveguide arm of the MZI;

or providing said at least first part, $\Delta L_1$, to said at least third waveguide section and said at least second part, $\Delta L_2$, to said at least fourth waveguide section of the second waveguide arm of the MZI.

In an embodiment of the method according to the invention, the method further comprises the step of providing at least one tuning element to at least one of the first waveguide arm of the MZI and the second waveguide arm of the MZI for adjusting the effective mode index, $N_{eff}$, of at least one of the first and the second waveguide arms so as to improve an overlap of said passbands of the polarization splitting response of the MZI with said channels of the AWG.

BRIEF DESCRIPTION OF THE DRAWINGS

On the attached drawing sheets.

The figures are not necessarily drawn to scale. In the figures identical components are denoted by the same reference numerals.

DETAILED DESCRIPTION

The abovementioned and other features and effects of the present invention will be explained in more detail below with reference to the abovementioned drawings in which preferred and illustrative embodiments of the invention are shown. The skilled person will realize that other alternatives and equivalent embodiments of the invention can be conceived and reduced to practice without departing from the scope of the present invention.

Figure 1:
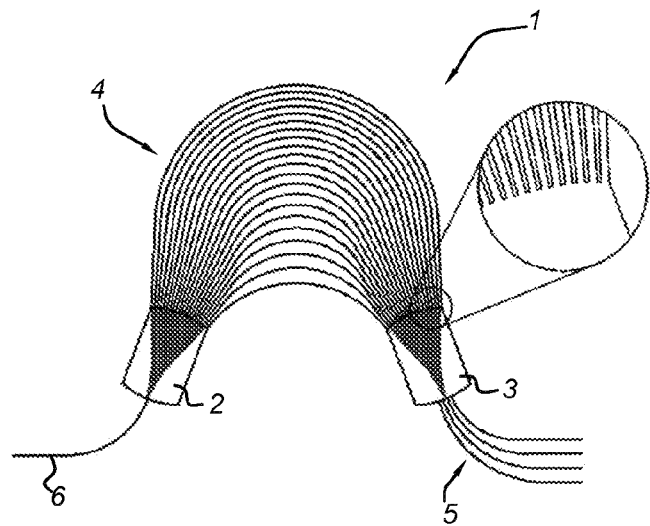
FIG. 1 schematically shows a basic layout of a known arrayed waveguide grating (AWG)
Figure 2A:
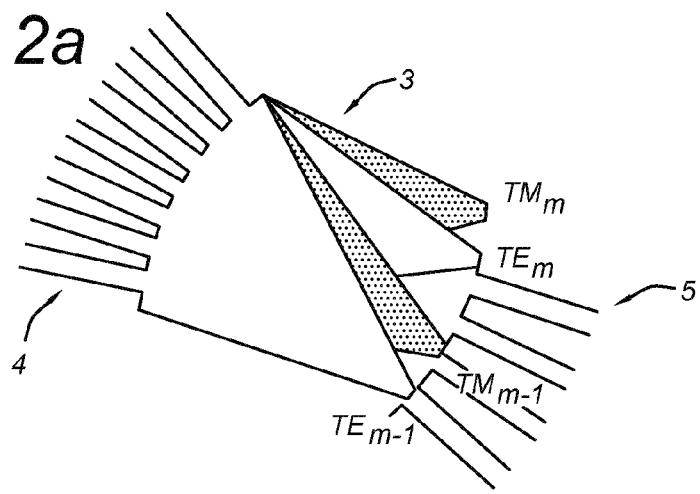
FIG. 2a schematically shows how different orders of TE and TM polarized light, i.e. $TE_m$, $TE_{m-1}$, $TM_m$, $TM_{m-1}$, that exit the waveguides of the array of waveguides that are arranged at a first side of the output slab region of the AWG are projected on the output waveguides that are arranged at the opposite side of the output slab region of the AWG.
Figure 2B:
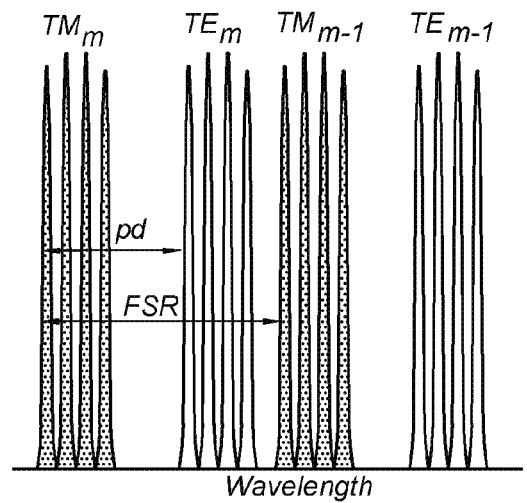
FIG. 2b schematically shows a spectral distribution of the different orders of the TE and TM polarized light, i.e. $TE_m$, $TE_{m-1}$, $TM_m$, $TM_{m-1}$. From this spectral distribution the polarization dispersion and the Free Spectral Range (FSR) can be determined.

FIGS. 1, 2a and 2b have been discussed in the introduction reciting the background of the invention.

Waveguide Birefringence

Figure 3A:
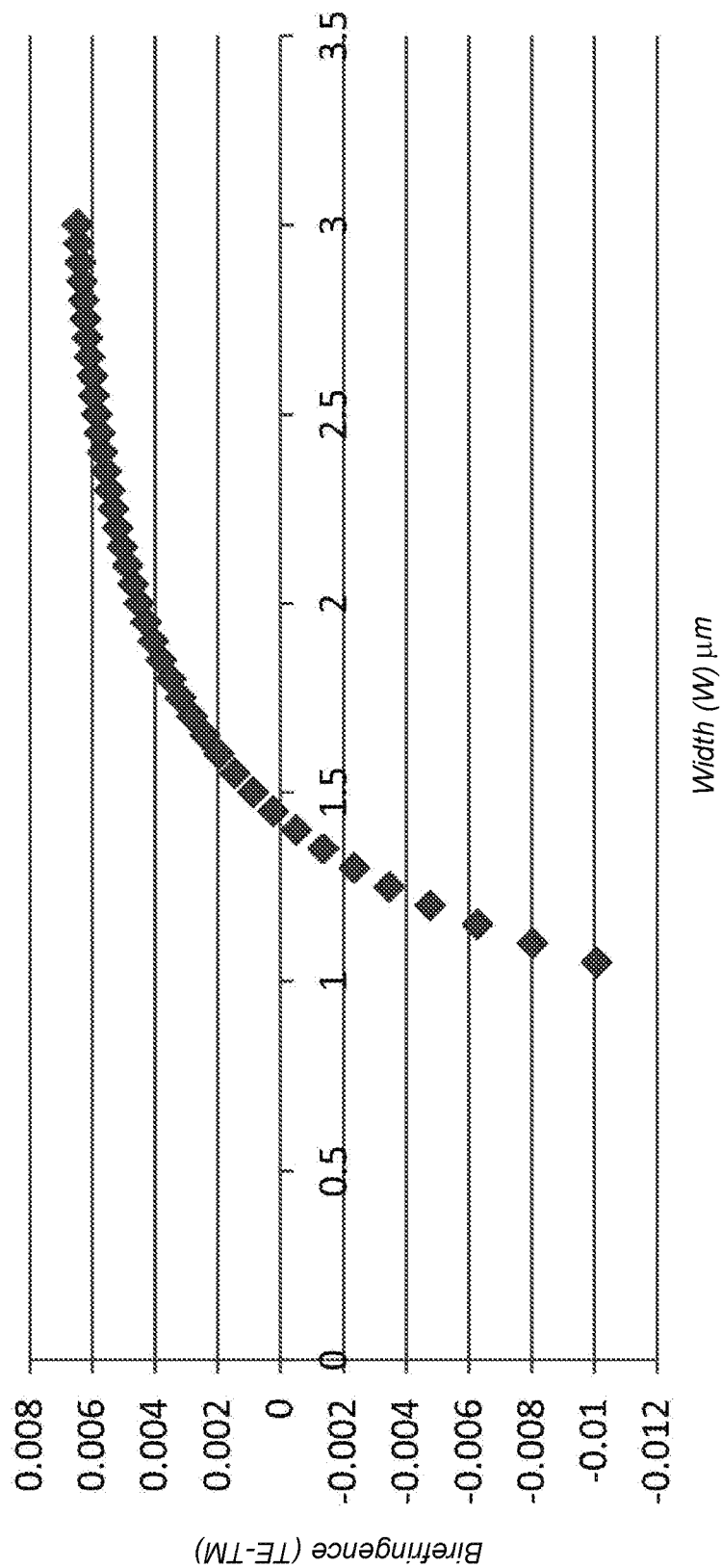
FIG. 3a schematically shows typical waveguide birefringence for Indium Phosphide (InP) waveguides as a function of waveguide width (W) in micrometer.

In standard InP waveguides the difference between the mode indices for TE and TM polarizations ($\Delta N_{eff,TE-TM}$), also called the birefringence, depends on the waveguide width (W). FIG. 3a schematically shows typical waveguide birefringence for InP waveguides as a function of waveguide width (W) in micrometer. There is a certain waveguide width (around W=1.45 µm) for which the birefringence ($\Delta N_{eff,TE-TM}$) is zero, but a small deviation from this ideal width leads to significant polarization splitting.

Figure 3B:
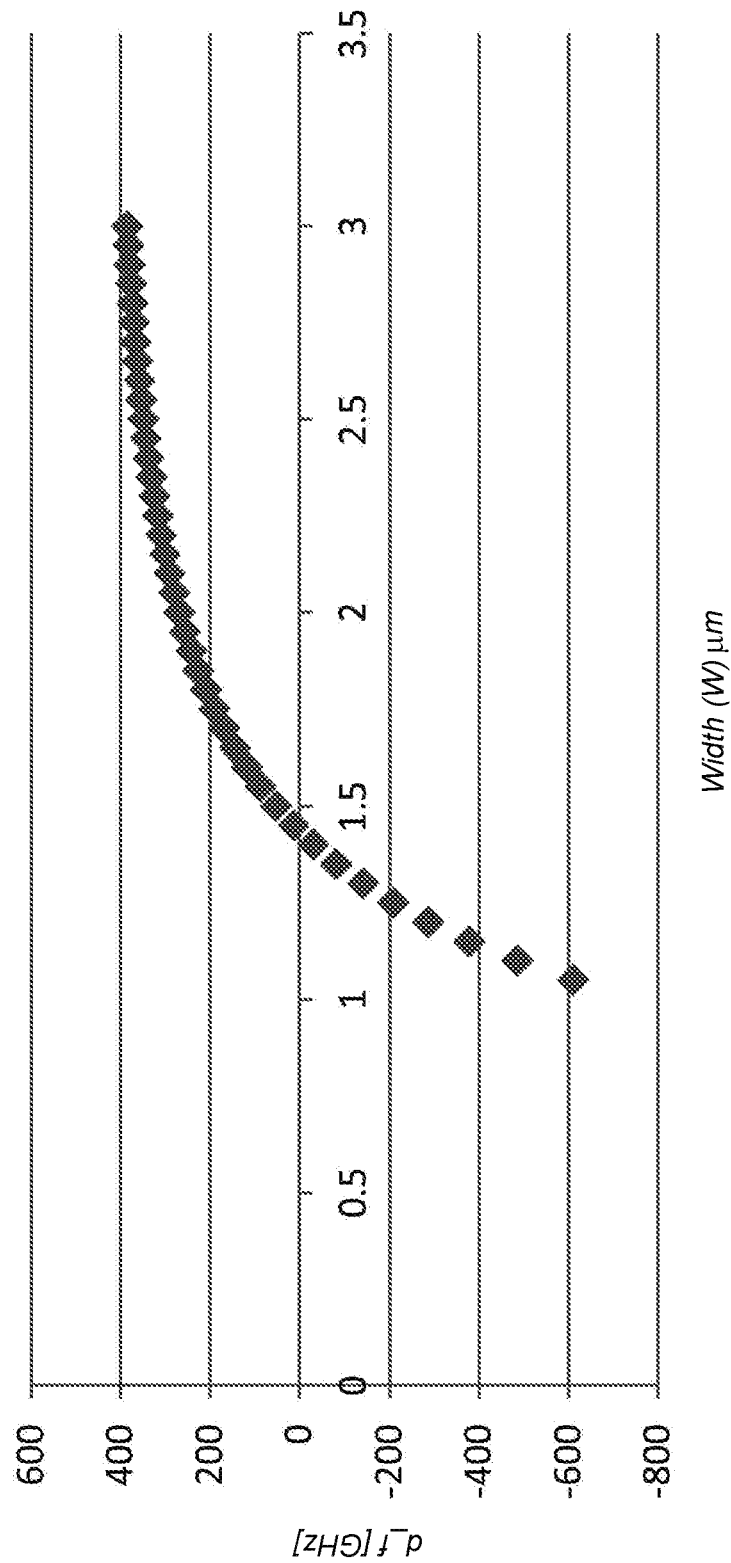
FIG. 3b schematically shows typical resulting polarization splitting (in GHz) for Indium Phosphide (InP) waveguides as a function of waveguide width (W) in micrometer.

FIG. 3b schematically shows typical polarization splitting (in GHz) for InP waveguides as a function of waveguide width (W) in micrometer, wherein the polarization splitting results from a typical fabrication tolerance for the width (W) of the waveguide of ±0.1 µm. From FIG. 3b it can be seen that the resulting polarization splitting around W=1.45 µm for a 0.1 µm width variation is around ±100 GHz. Making an AWG with this waveguide type is therefore not very tolerant to fabrication errors.

Figure 4:
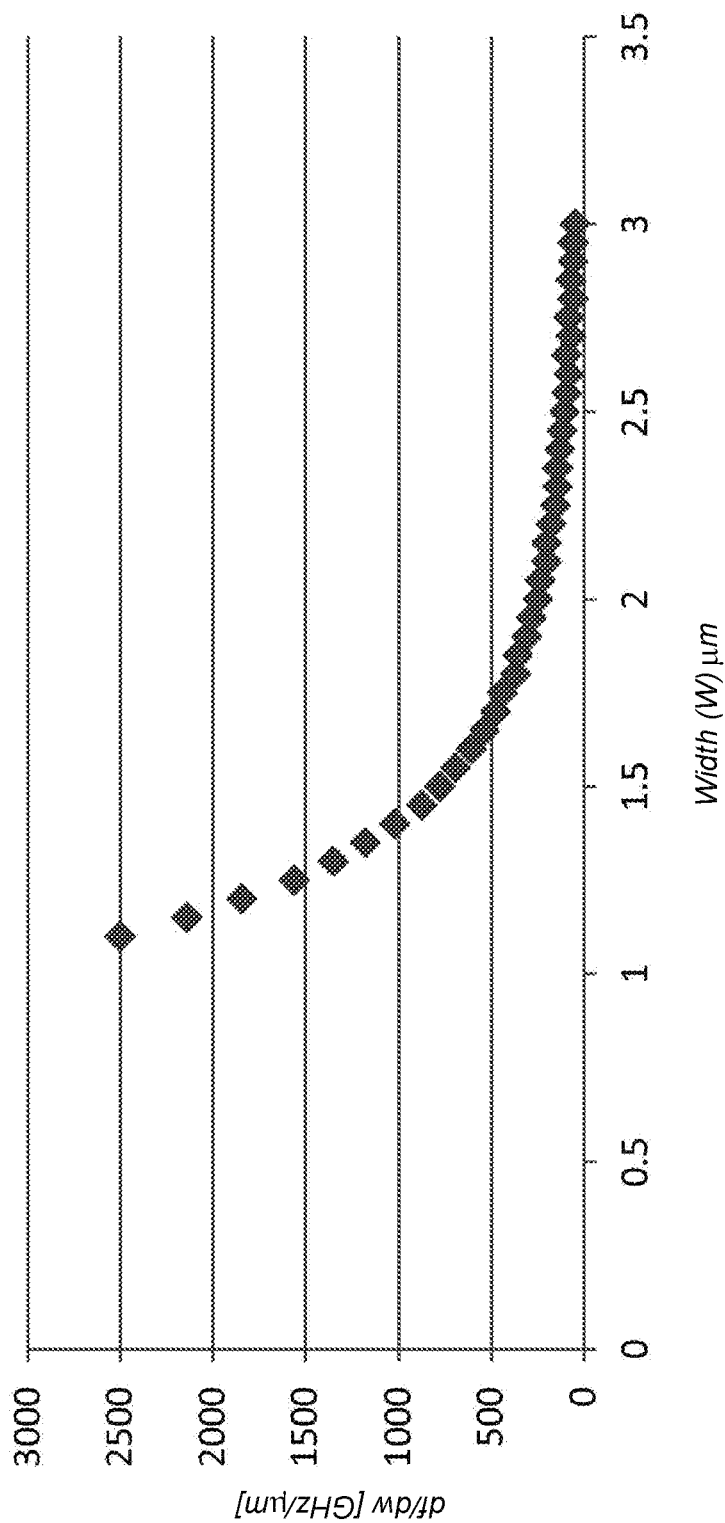
FIG. 4 schematically shows typical polarization splitting per micrometer width deviation for various waveguide widths (W) in micrometer.

FIG. 4 schematically shows typical polarization splitting per micrometer width deviation (df/dW in GHz/µm) for various waveguide widths (W) in micrometer. From FIGS. 3a and 4 it is apparent that moving to wider waveguides makes the birefringence larger, but more tolerant to fabrication variations. FIG. 4 shows that waveguides having a width of at least 2 µm cause polarization splitting values of at most ±250 GHz/µm. In the context of this invention, waveguides having a width (W) of at least 2 µm are considered to be more fabrication tolerant than waveguides having a width smaller than 2 µm.

Figure 5:
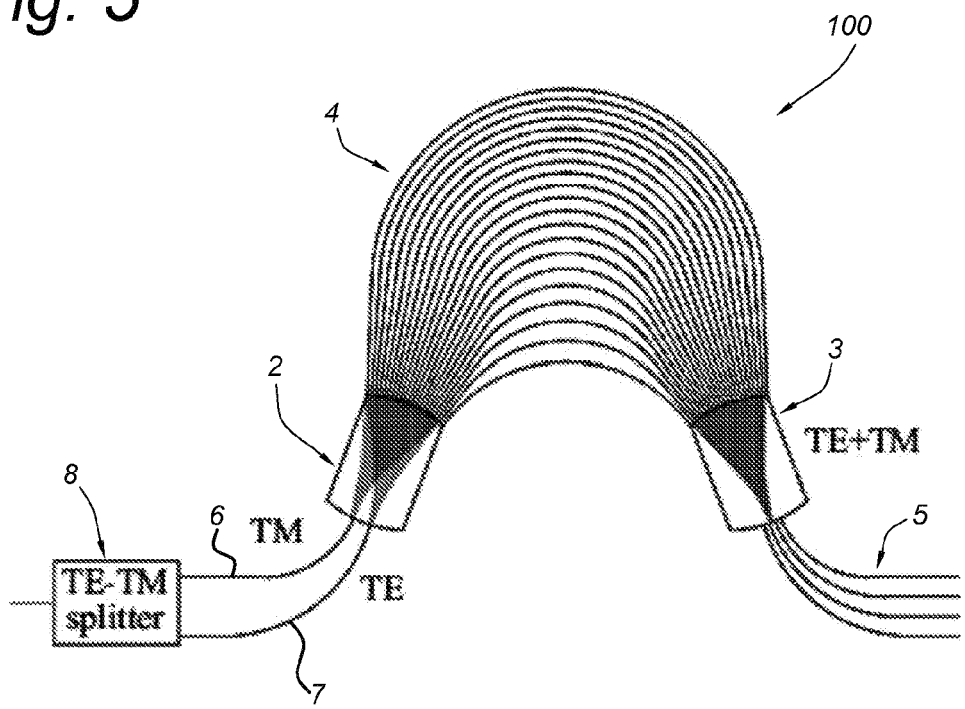
FIG. 5 schematically shows a basic layout of a known polarization insensitive AWG using two separate inputs for the two polarization states, i.e. TE and TM.

As mentioned above, from the prior art document by M. K. Smit and C. van Dam, an approach is known for making an AWG polarization independent. In this approach two separate inputs for the two polarization states, i.e. TE and TM, are used as is schematically shown in FIG. 5. In this case, the input slab region 2 of the AWG 1 is further in optical communication with a second input waveguide 7. The first input waveguide 6 is provided with TE polarized light from the optical input signal, whereas the second input waveguide 7 is provided with TM polarized light from the optical input signal.

The first 6 and second 7 input waveguides are arranged relative to the input slab region 2 at a first and a second position. These first and second positions are matched to the polarization dispersion caused by the birefringence of the waveguides of the array of waveguides 4 of the AWG 1.

The polarization beam splitter 8 for splitting the TE and TM polarization states of the optical input signal is in optical communication with the first 6 and second 7 input waveguides of the birefringent AWG 1.

Based on the above, in order to improve the fabrication tolerance of the AWG 1, the waveguides of the array of waveguides 4 can be made wider so that the birefringence is less sensitive to fabrication errors, e.g. the width (W) can be chosen in a range of 2-3 µm. To make the device cost effective, it is desired to integrate the polarization beam splitter 8 in the same technology.

Integrated Polarization Beam Splitters

Figure 6A:
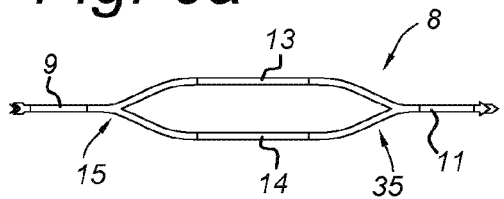
FIG. 6a schematically shows a top view of a Mach-Zehnder Interferometer (MZI) structure having a single input, a single output, and two arms with equal lengths.

Several methods of realizing an integrated polarization beam splitter have been published, but the architecture that is most compatible with the technology used to realize the AWG, is based on a Mach-Zehnder Interferometer (MZI) structure as is known from Y. Hashizume et al., "Integrated Polarisation Beam Splitter using Waveguide Birefringence Dependence of Waveguide Core Width", Electr. Lett. Vol. 37, No. 25, December 2001, and US Patent Application 2009/0214150A1. FIG. 6a schematically shows a top view of the basic MZI structure 8 having a single input 9, a single output 11, and two arms 13, 14 with equal lengths. This structure operates as follows. Light from the single input waveguide 9 is split into two different waveguide arms 13, 14 that have different optical properties. The length of the arms 13, 14 can be different, but also the width or other cross-section parameters can vary. The two waveguides 13, 14 are then combined together again and depending on the relative phase difference of the two signals the output of the MZI 8 is high or low.

Figure 6B:
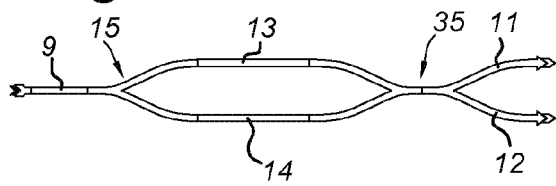
FIG. 6b schematically shows a top view of a MZI structure having a single input, two outputs, and two arms with equal lengths.
Figure 6C:
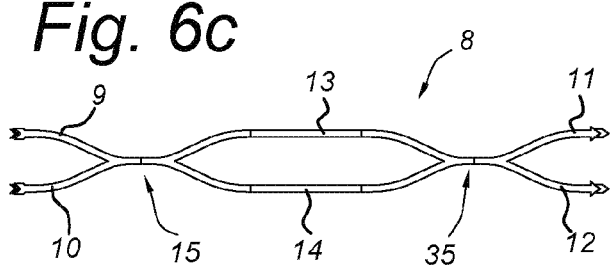
FIG. 6c schematically shows a top view of a MZI structure having two inputs, two outputs, and two arms with equal lengths.

The MZI 8 can be realized with one 9 or two 9, 10 inputs and one 11 or two 11, 12 outputs as is schematically shown in FIGS. 6b and 6c. The splitters and combiners 15 can be made using for example Y-branch couplers, directional couplers or Multi-Mode Interference (MMI) couplers.

It is also possible to actively control the properties of the light travelling through one or two arms by placing an electrode 16 on either one of the arms and use temperature, electric field or current-injection effects to change the waveguide properties. The MZI 8 can therefore be used as a (tunable-) filter or as an active switch.

From the above mentioned prior art document by Y. Hashizume et al. it is known that the transmission response of an MZI 8 with two inputs ($I_1$ and $I_2$) and two outputs ($O_1$ and $O_2$) under the assumption that both couplers have a coupling ration of 50%, can be written as:

$$\frac{O_1}{I_1} = \sin^2\left(\frac{\pi\Delta(N_{eff}L)}{\lambda}\right) \qquad \text{Eq. 2}$$

$$\frac{O_2}{I_1} = \cos^2\left(\frac{\pi\Delta(N_{eff}L)}{\lambda}\right) \qquad \text{Eq. 3}$$

In these equations, $\lambda$ is the wavelength of the optical input signal, and $\Delta(N_{eff}L)$ is the optical path difference between the first 13 and the second 14 waveguide arms of the MZI 8. The response of the MZI is therefore determined by the difference in effective mode index ($N_{eff}$) and the difference in length ($\Delta L$) between the two arms.

To realize the polarization splitting function, the waveguides need to be chosen in such a way that there is a certain birefringence in the waveguide arms 13, 14 ($N_{eff,TE} \neq N_{eff,TM}$). Furthermore, the following conditions need to be satisfied:

$$\Delta(N_{eff,TE}L) = n\lambda \qquad \text{Eq. 4}$$

$$\Delta(N_{eff,TM}L) = \left(m + \frac{1}{2}\right)\lambda \qquad \text{Eq. 5}$$

where, n and m are integers, and λ is the signal wavelength.

The equations above show that there are two approaches to design the polarization splitter 8:
- one using different birefringence for the waveguide arms (e.g. by using different waveguide widths); and
- another one using a fixed birefringence for both arms and choose an appropriate length difference (ΔL).

Due to the nature of the fabrication process of the integrated photonic component 100, deviations from the designed waveguide width usually are very similar for two waveguides that are close together on a wafer. Therefore, the option of choosing a fixed birefringence is more attractive from a fabrication tolerance point of view. From US 2009/0214150A1, it is known that the criterion for the length difference, ΔL, for obtaining polarization splitting, in this case becomes:

$$\Delta L = \left(p + \frac{1}{2}\right)\frac{\lambda^2}{n_g \Delta \lambda} = \left(p + \frac{1}{2}\right)\frac{\lambda}{\Delta N_{eff,TE-TM}} \qquad \text{Eq. 6}$$

In this equation, p=n−m is an integer, $n_g$ is the group index ($n_g = N_{eff} - \lambda dN_{eff}/d\lambda$), Δλ is the polarization dispersion which is exactly the same as given in Eq. 1, and $\Delta N_{eff,TE-TM}$ is the birefringence ($\Delta N_{eff,TE-TM} = N_{eff,TE} - N_{eff,TM}$).

In an embodiment of the integrated photonic component 100 according to the invention, each of the first 13 and second 14 waveguide arms of the MZI 8 comprises at least one waveguide section, wherein the length difference, ΔL, is provided to one of said at least one waveguide sections of the first 13 or the second 14 waveguide arms.

Figure 6D:
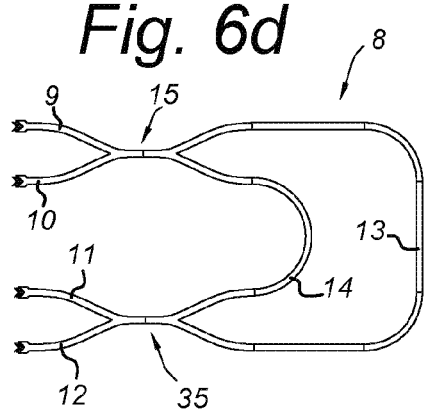
FIG. 6d schematically shows a top view of a MZI structure having two inputs, two outputs, and two arms with unequal lengths.

FIG. 6d schematically shows a top view of a MZI structure 8 having two inputs 9, 10; two outputs 11, 12; and two arms 13, 14 with unequal lengths for obtaining the polarization splitting response of the polarization beam splitter 8 that is a periodic function of the wavelength of the optical input signal. The resulting MZI response is plotted in FIG. 7.

Figure 7:
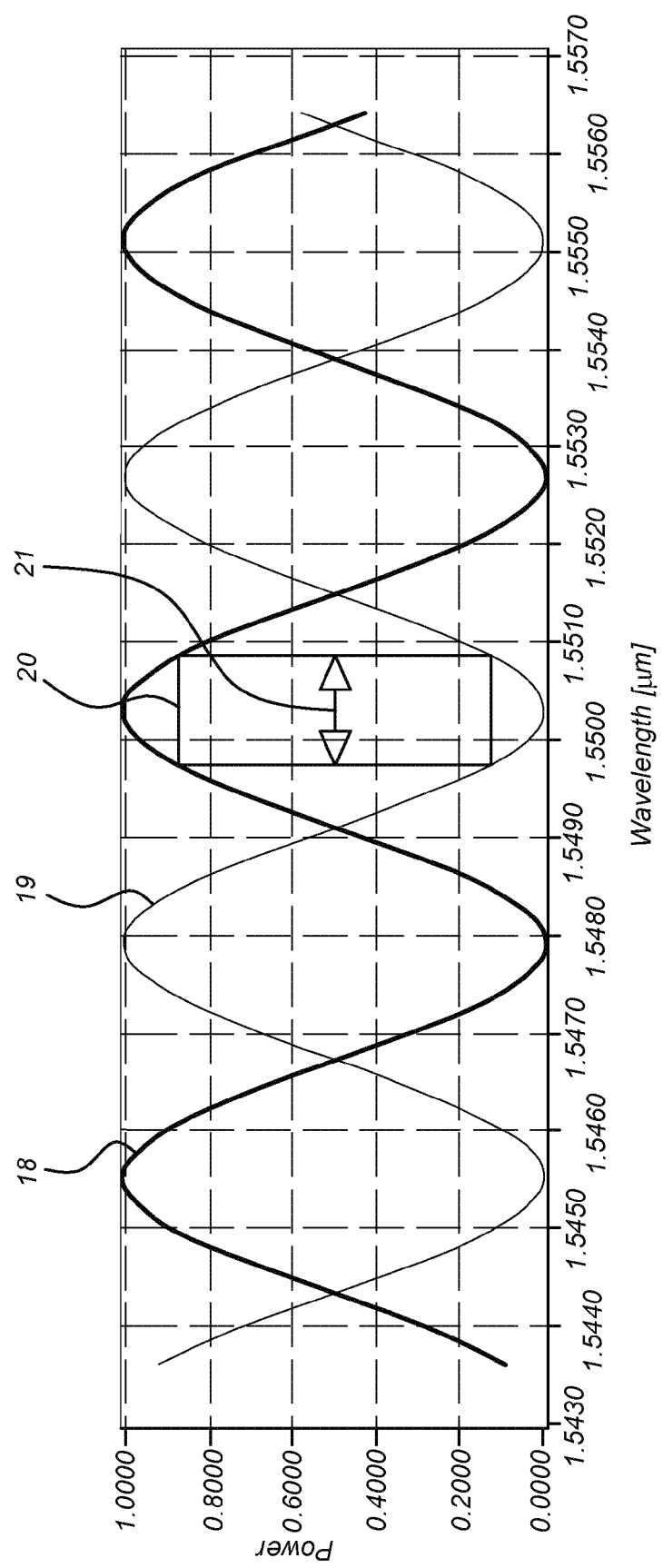
FIG. 7 schematically shows a transmission response as a function of the wavelength of an optical input signal for both TE and TM polarization states, the transmission response being measured at a first output of the MZI structure shown in FIG. 6d.

The transmission response of the MZI as a function of the wavelength of an optical input signal for both TE and TM polarization states, as schematically shown in FIG. 7 is measured at output 1 of the MZI structure shown in FIG. 6d. The bold line 18 indicates TE polarization, while the thin line 19 shows the TM polarization. There are several limited bandwidth regions providing operating ranges where there is good polarization filtering, e.g. around λ=1.5503 μm. This operating range is schematically indicated in FIG. 7 using a box 20 and a double arrow 21.

The response that can be measured at output 2, which is not shown in FIG. 7, is exactly mirrored, giving high TM transmission at the same wavelengths where output 1 has high TE transmission. In this example the birefringence was 0.005651, which is close to the upper limit in standard waveguides in InP.

Equation 1 shows the Free Spectral Range (FSR) of the MZI filter as plotted in FIG. 7. It therefore also tells us that the bandwidth of such a polarization beam splitter is limited by the maximum achievable birefringence. In practice, the bandwidth around a given central wavelength λ is only a few nanometer (nm).

Arrayed Waveguide Grating with Integrated MZI-Based Polarization Beam Splitter

In order to be able to use the MZI-based polarization beam splitter 8 in combination with an AWG 1 as shown in FIG. 5, we have to design the MZI 8 in such a way that not only equation 6 (eq. 6) is satisfied, but also that the FSR is matched to the channel spacing of the AWG 1.

Given an AWG 1 with a channel spacing $\Delta\lambda_{AWG}$ and a central channel wavelength $\lambda_c$, the length difference (ΔL) required in the MZI filter 8 is given by:

$$\Delta L = \Delta L_{match} = \frac{\lambda_c^2}{n_g \Delta \lambda_{AWG}} \qquad \text{Eq. 7}$$

With the obtained ΔL the required birefringence is given by:

$$\Delta N_{eff,TE-TM} = \left(p + \frac{1}{2}\right)\frac{\lambda_c}{\Delta L_{match}} \qquad \text{Eq. 8}$$

In this equation p is an integer that can be chosen such that the target birefringence is in the fabrication tolerant waveguide width range as shown in FIGS. 3b and 4, i.e. the waveguide width, W, is at least 2 μm.

Figure 8:
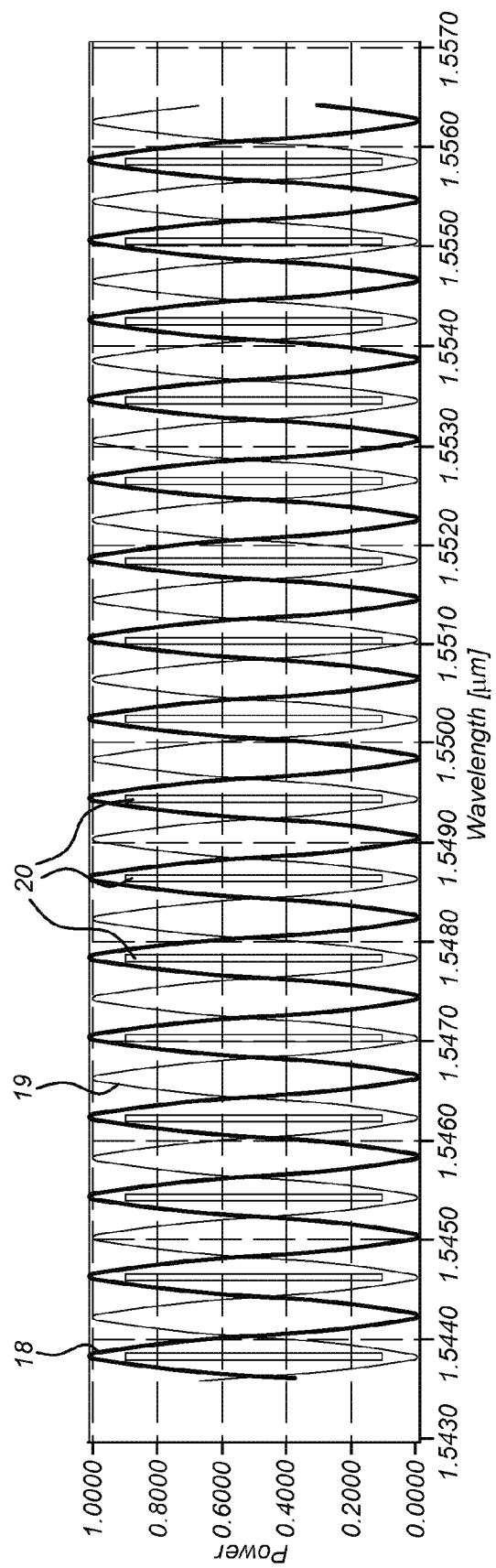
FIG. 8 schematically shows a calculated polarization splitting response of an embodiment of the integrated photonic component according to the invention, wherein the polarization splitting response has multiple passbands, and wherein the MZI has a FSR that is matched to the channel spacing of the AWG, $\Delta\lambda_{AWG}$.

FIG. 8 schematically shows a calculated polarization splitting response of an embodiment of the integrated photonic component according to the invention, wherein the polarization splitting response has multiple passbands, and wherein the MZI 8 has a FSR that is matched to a channel spacing of the AWG, $\Delta\lambda_{AWG}$, that is equal to 0.8 nm. The bold line 18 indicates TE polarization, while the thin line 19 shows the TM polarization. From FIG. 8 it can be seen that the polarization splitting regions form multiple narrow operating ranges that are separated exactly 0.8 nm. The operating ranges are schematically being indicated by boxes 20. The polarization splitter can therefore be used over a wide wavelength range and is suitable for use in a WDM system.

Channel Bandwidth

Figure 9:
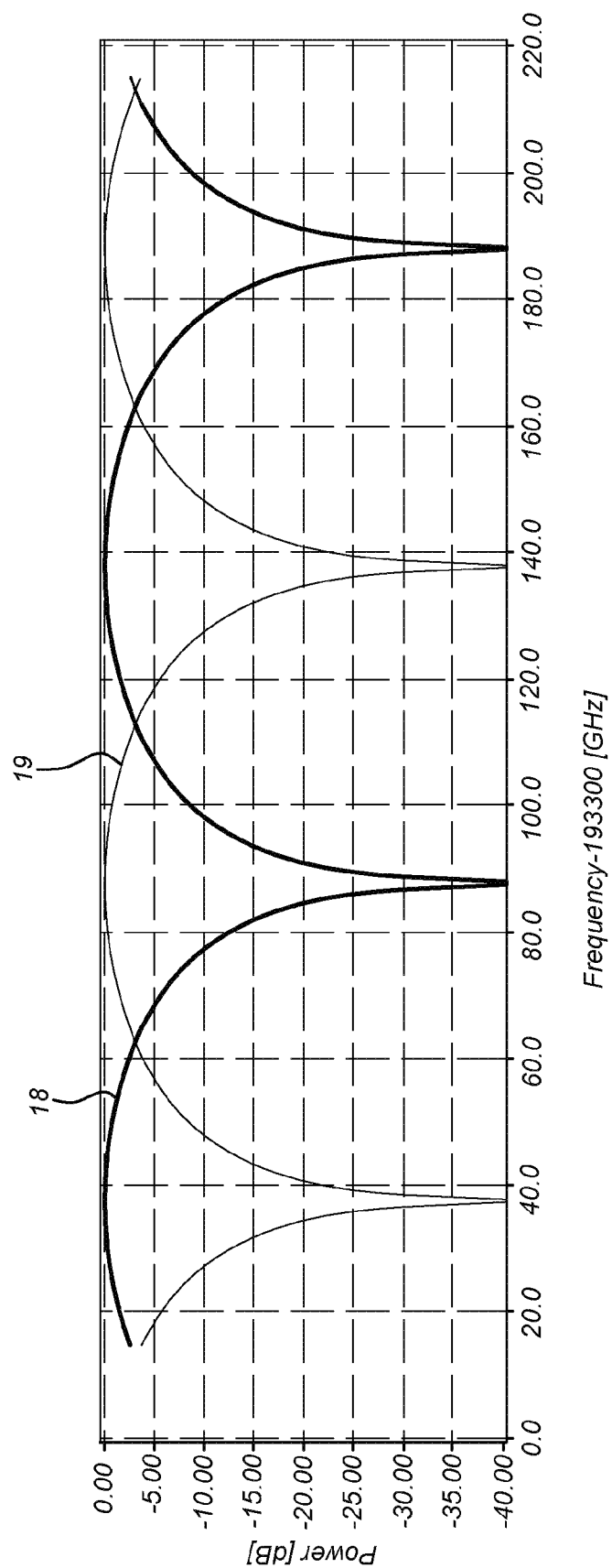
FIG. 9 schematically shows a detail of the calculated polarization splitting response shown in FIG. 8, but now as a function of frequency of the optical input signal.

The channel bandwidth of the combination 100 of the polarization beam splitter 8 and the AWG 1 is mainly determined by the required extinction ratio on the polarization splitter. FIG. 9 schematically shows a detail of the calculated polarization splitting response shown in FIG. 8, but now as a function of frequency of the optical input signal. Again, the bold line 18 indicates TE polarization, while the thin line 19 shows the TM polarization. If an optical bandwidth of about 10 GHz is required, the filter 8 gives an extinction ratio of about 15 dB, while if an extinction ratio of e.g. more than 20 dB is required, the bandwidth of the filter is about 6.8 GHz.

Fine-Tuning of Polarization Beam Splitter

The optimal bandwidth of the polarization beam splitter 8 is obtained when the exact positions of the filter passbands overlap perfectly with the AWG channels. Small fabrication errors can easily disturb this and therefore it might be required to add one or multiple fine-tuning electrode(s) 16 on the arms 13, 14 of the MZI 8. The tuning electrodes can be at least one of thermal electrodes, reverse bias field-effect electrodes, forward bias current-injection electrodes, etc., all in order to adjust the refractive index of the filter 8 so that the passbands of the filter overlap with the AWG channels. A total tuning range of 2π is required for full FSR tuning.

Figure 10:
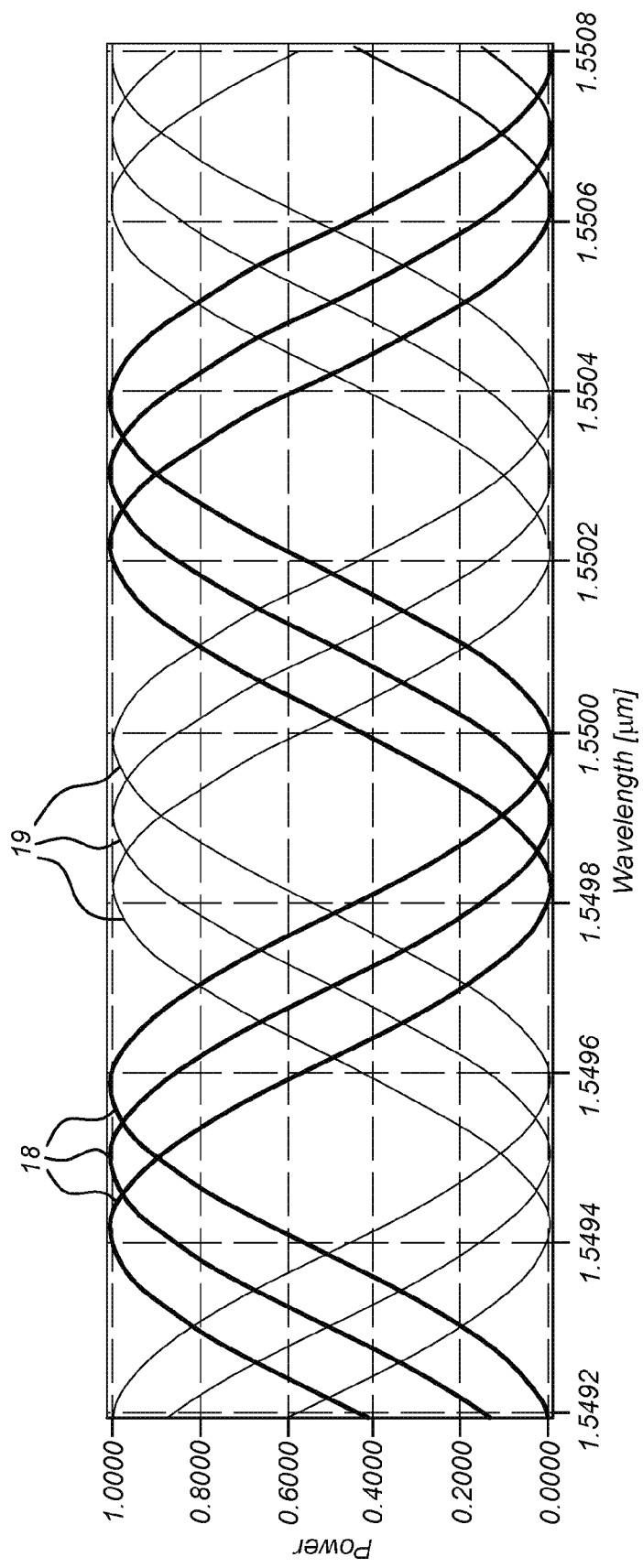
FIG. 10 schematically shows a transmission response as a function of the wavelength of the optical input signal for both TE and TM polarization states, the transmission response being measured at a first output of the MZI structure shown in FIG. 6d while fine-tuning the refractive index of the waveguides.

FIG. 10 schematically shows a transmission response as a function of the wavelength of the optical input signal for both TE and TM polarization states. Also in this case, the bold line 18 indicates TE polarization, while the thin line 19 shows the TM polarization. The transmission response is measured at output 1 of the MZI structure 8 shown in FIG. 6d while fine-tuning the refractive index of the waveguides. From FIG. 10 it can be seen that due to the fine-tuning the areas of optimal polarization splitting shift with respect to the wavelength. In this way the exact positions of the filter passbands can be brought in perfect overlap with the AWG channels.

Distributed Length Difference

Figure 11:
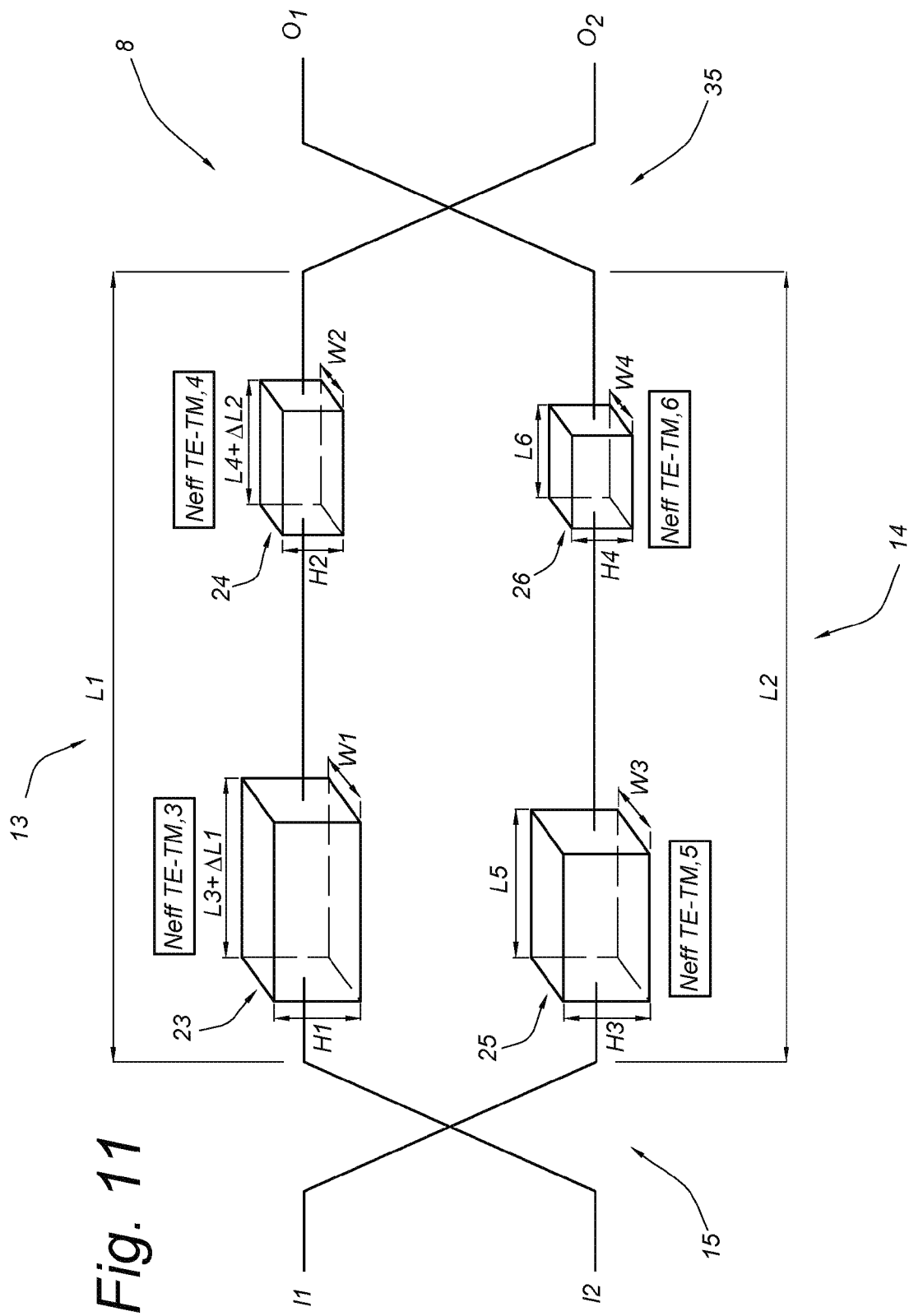
FIG. 11 schematically shows a MZI structure having a first waveguide arm that comprises a first and a second waveguide section, and a second waveguide arm having a third and a fourth waveguide section, wherein the length difference, $\Delta L$, is divided into a first part, $\Delta L_1$, and a second part, $\Delta L_2$, wherein the first part, $\Delta L_1$, is provided to the first waveguide section and the second part, $\Delta L_2$, is provided to the second waveguide section of the first wave of the MZI.

FIG. 11 schematically shows an embodiment of the MZI structure 8 of the integrated photonic component 100 according to the invention comprising a first waveguide arm 13 having a first length $L_1$, and a second waveguide arm 14 having a second length $L_2$. The first waveguide arm 13 comprises a first 23 and a second 24 waveguide section. The first waveguide section 23 has a third birefringence, $\Delta N_{eff,TE-TM,3}$, a third length, $L_3$, a first width, $W_1$, and a first height, $H_1$. The second waveguide section 24 has a fourth birefringence, $\Delta N_{eff,TE-TM,4}$, a fourth length, $L_4$, a second width, $W_2$, and a second height, $H_2$. In this embodiment of the MZI 8, at least one of the first width, $W_1$, and the first height, $H_1$, is unequal to at least one of the second width, $W_2$, and the second height, $H_2$, such that the third birefringence, $\Delta N_{eff,TE-TM,3}$, and the fourth birefringence, $\Delta N_{eff,TE-TM,4}$, are unequal.

The second waveguide arm 14 of the MZI 8 comprises a third 25 and a fourth 26 waveguide section. The third waveguide section 25 has a fifth birefringence, $\Delta N_{eff,TE-TM,5}$, a fifth length, $L_5$, a third width, $W_3$, and a third height, $H_3$. The fourth waveguide section 26 has a sixth birefringence, $\Delta N_{eff,TE-TM,6}$, a sixth length, $L_6$, a fourth width, $W_4$, and a fourth height, $H_4$. In this embodiment of the MZI 8, at least one of the third width, $W_3$, and the third height, $H_3$, is unequal to at least one of the fourth width, $W_4$, and the fourth height, $H_4$, such that the fifth birefringence, $\Delta N_{eff,TE-TM,5}$, and the sixth birefringence, $\Delta N_{eff,TE-TM,6}$, are unequal.

In this embodiment of the MZI 8, the third and the fifth birefringences have a same first value, and the fourth and the sixth birefringences have a same second value, whereas the first and second values are unequal.

The length difference between the first 13 and second 14 waveguide arms, $\Delta L = L_1 - L_2$, comprises at least a first part, $\Delta L_1$, and a second part, $\Delta L_2$, as schematically shown in FIG. 11. In this embodiment of the MZI 8, the first part, $\Delta L_1$, of the length difference is provided to the first waveguide section 23 having a length, $L_3 + \Delta L_1$, and the second part, $\Delta L_2$, of the length difference is provided to the second waveguide section 24 having a length, $L_4 + \Delta L_2$. It will be clear to the skilled person that in another embodiment of the MZI 8, the first part, $\Delta L_1$, of the length difference can also be provided to the third waveguide section 25, and the second part, $\Delta L_2$, of the length difference can also be provided to the fourth waveguide section 26.

WDM Photonic Integrated Circuit

Figure 12:
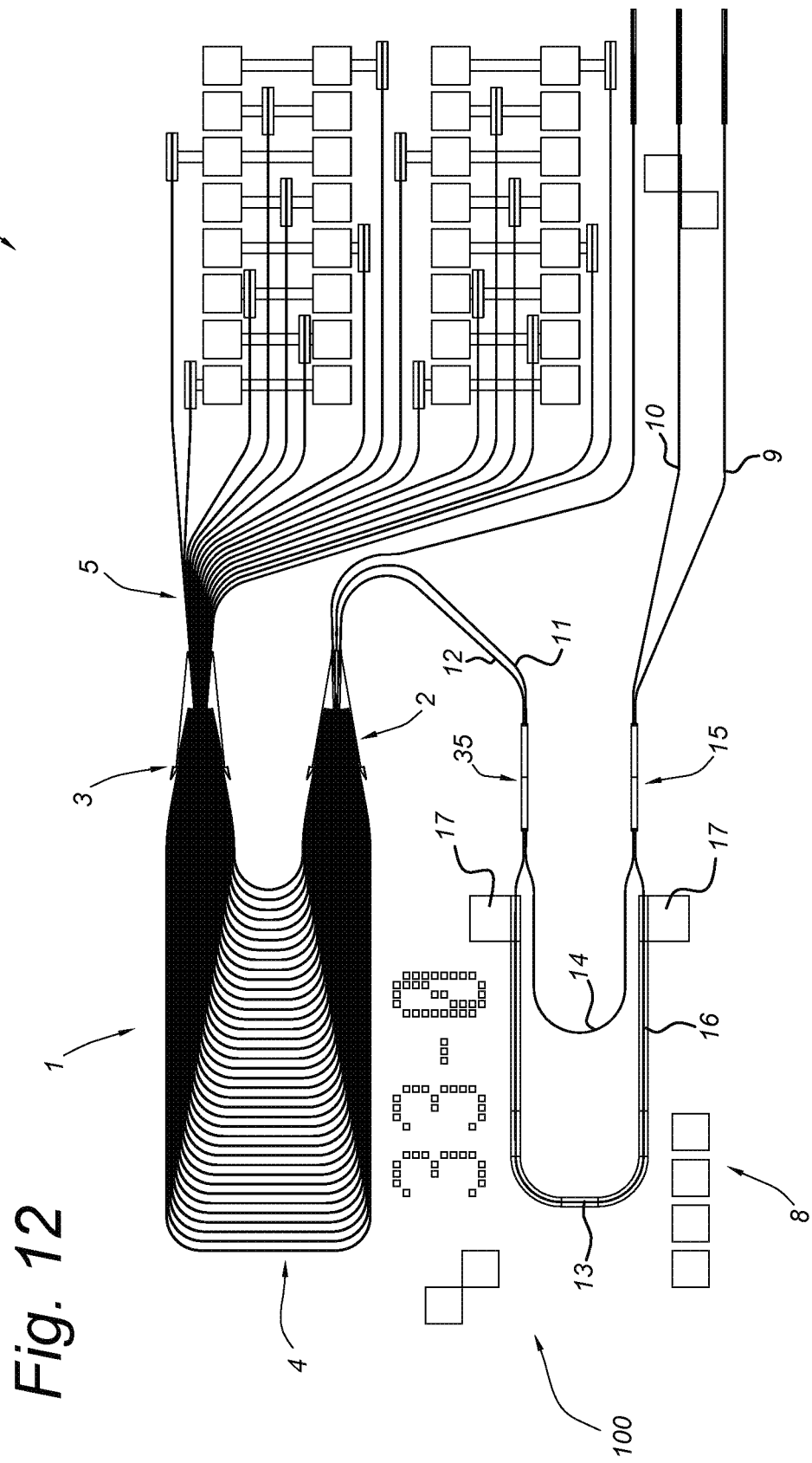
FIG. 12 schematically shows a chip layout of a 16-channel WDM receiver, being an embodiment of a photonic integrated circuit (PIC) according to the present invention, wherein the PIC comprises an embodiment of the integrated photonic component according to the present invention comprising a fabrication tolerant AWG and a MZI-based polarization splitter.

FIG. 12 schematically shows a chip layout of a 16-channel WDM receiver, being an embodiment of a photonic integrated circuit (PIC) 200 according to the present invention, wherein the PIC 200 comprises an embodiment of the integrated photonic component 100 according to the present invention comprising a fabrication tolerant AWG 1 and a MZI-based polarization beam splitter 8. The polarization beam splitter comprises a MZI having a first 13 and a second waveguide arm 14. The first waveguide arm 13 is provided with a tuning electrode 16 that comprises two contact pads 17 for electrically contacting the tuning electrode 16.

Waveguide Composition

Figure 13:
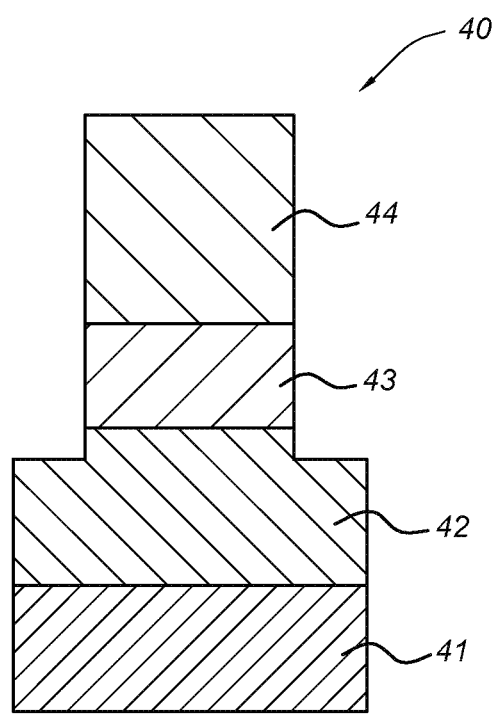
FIG. 13 schematically shows a cross-section of an embodiment of the waveguides of the integrated photonic component.

FIG. 13 schematically shows a cross-section 40 of an embodiment of the waveguides 4, 5, 6, 7, 9, 10, 11, 12, 13, 14 of the AWG 1 and the MZI 8 of the integrated photonic component 100. According to the embodiment shown in FIG. 13, the cross-section 40 schematically indicates that the waveguide comprises different layers of different materials. In the shown embodiment, the waveguide is a ridge waveguide that is formed in a stack of three different epitaxial layers that are arranged on top of a substrate 41 by a suitable growth technique. Suitable growth techniques comprise CVD, e.g. MOCVD, and MBE.

In the embodiment shown in FIG. 13, the substrate 41 comprises Indium Phosphide (InP) material. In another embodiment the substrate for example comprises Silicon-based material, more particularly Silicon On Insulator.

The first layer 42 of the stack of three epitaxial layers shown in FIG. 13, is arranged on top of the substrate 41 and comprises n-type doped InP. This layer provides a bottom cladding of the waveguide.

The second layer 43 of the stack of three epitaxial layers shown in FIG. 13, is arranged on top of the first layer 42 and comprises one of Indium Gallium Arsenide Phosphide (InGaAsP) and Indium Aluminum Gallium Arsenide (InAlGaAs). This layer provides a core of the waveguide.

The third layer 44 of the stack of three epitaxial layers shown in FIG. 13, is arranged on top of the second layer 43 and comprises p-type doped InP. This layer provides a top cladding of the waveguide.

The present invention can be summarized as follows. An integrated photonic component 100 is provided for polarization insensitive wavelength multiplexing at least one optical input signal in a wavelength division multiplexing, WDM, system. The integrated photonic component comprises an arrayed waveguide grating, AWG, 1 having a predetermined polarization splitting and a MZI-based polarization beam splitter 8 that is configured to compensate the predetermined polarization splitting of the AWG 1. The result is a fabrication tolerant integrated photonic component 100 that is operable over a wide number of limited bandwidth wavelength channels of the WDM system. The invention further provides a photonic integrated circuit, PIC, 200 for use in a WDM system. The PIC 200 comprises the integrated photonic component 100 of the invention. Furthermore, the invention provides a method of designing the integrated photonic component 100 discussed above.

In the foregoing, the invention has been described with reference to specific embodiments thereof. It will, however, be evident to the skilled person that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An integrated photonic component for polarization insensitive wavelength multiplexing comprising:
an arrayed waveguide grating, AWG, having an input slab region and an output slab region that are in optical communication by an array of birefringent waveguides, the waveguides of said array of waveguides having a length increment from one waveguide to the next, the output slab region further being in optical communication with a plurality of output waveguides, the input slab region further being in optical communication with at least a first input waveguide and a second input waveguide, said first and second input waveguides being arranged relative to the input slab region at a first and a second position, said first and second positions being matched to the polarization dispersion caused by the birefringence of the waveguides of the array of waveguides, the AWG further having a central channel wavelength, $\lambda_c$, and a number of channels being spaced apart by a channel spacing, $\Delta\lambda_{AWG}$; and
a polarization beam splitter comprising a first output waveguide and a second output waveguide, said first and second output waveguides being in optical communication with the first and second input waveguides arranged at the input slab region of the AWG, the polarization beam splitter further comprising a birefringent Mach-Zehnder interferometer, MZI, for splitting an optical input signal into a transverse electric, TE, polarized optical signal and a transverse magnetic, TM, polarized optical signal, the TE polarized optical signal being provided to the first input waveguide arranged at the input slab region of the AWG via the first output waveguide of the polarization beam splitter, and the TM polarized optical signal being provided to the second input waveguide arranged at the input slab region of the AWG via the second output waveguide of the polarization beam splitter, the MZI being configured to have a polarization splitting response that is a periodic function of wavelength of the optical input signal, said polarization splitting response having multiple passbands, wherein the MZI has a free spectral range, FSR, that is matched to the channel spacing of the AWG, $\Delta\lambda_{AWG}$.

2. The integrated photonic component according to claim 1, wherein the polarization beam splitter comprises a MZI comprising a first waveguide arm having a first effective mode index, $N_{eff,1}$, and a first length, $L_1$, defining a first optical path, $N_{eff,1}L_1$, and a second waveguide arm having a second effective mode index, $N_{eff,2}$, and a second length, $L_2$, defining a second optical path, $N_{eff,2}L_2$, said first and second optical paths being different, wherein the polarization beam splitter further comprises at least a first input waveguide, a first coupling element, and a second coupling element, wherein the first and the second waveguide arms of the MZI are in optical communication with the at least first input waveguide of the polarization beam splitter via the first coupling element, and wherein the first and the second waveguide arms of the MZI are in optical communication with the first and the second output waveguides of the polarization beam splitter via the second coupling element.

3. The integrated photonic component according to claim 2, wherein the first and the second coupling elements comprise at least one of a Y-branch coupler, a directional coupler, and a multi-mode interference coupler, MMI.

4. The integrated photonic component according to claim 2, wherein the polarization beam splitter has a first input waveguide, $I_1$, a second input waveguide, $I_2$, a first output waveguide, $O_1$, and a second output waveguide, $O_2$, and wherein by assuming that the first and the second coupling elements have a coupling ratio of 50%, the polarization splitting response of the polarization beam splitter that is a periodic function of the wavelength of the optical input signal is given by the equations:

$$\frac{O_1}{I_1} = \sin^2\left(\frac{\pi\Delta(N_{eff}L)}{\lambda}\right)$$

$$\frac{O_2}{I_1} = \cos^2\left(\frac{\pi\Delta(N_{eff}L)}{\lambda}\right)$$

in which equations $\lambda$ is the wavelength of the optical input signal, and $\Delta(N_{eff}L)$ is the optical path difference between the first and the second waveguide arms of the MZI, and further wherein for splitting the optical input signal into a TE polarized optical signal and a TM polarized optical signal, the optical path difference between the first and the second waveguide arms of the MZI for the TE polarized optical signal, $\Delta(N_{eff,TE}L)$, and the optical path difference between the first and the second waveguide arms of the MZI for the TM polarized optical signal, $\Delta(N_{eff,TM}L)$, must satisfy the equations:

$$\Delta(N_{eff,TE}L)=n\lambda$$

$$\Delta(N_{eff,TM}L)=(m+\tfrac{1}{2})\lambda$$

in which equations, n and m are integers, and $\lambda$ is the wavelength of the optical input signal.

5. The integrated photonic component according to claim 4, wherein the first waveguide arm of the MZI has a first birefringence, $\Delta N_{eff,TE-TM,1}$, and the second waveguide arm of the MZI has a second birefringence, $\Delta N_{eff,TE-TM,2}$, said first and second birefringences being substantially the same, and wherein the first length, $L_1$, of the first waveguide arm and the second length, $L_2$, of the second waveguide arm differ by a length difference, $\Delta L=L_1-L_2$, that is defined by the equation:

$$\Delta L = \left(p+\frac{1}{2}\right)\frac{\lambda^2}{n_g\Delta\lambda} = \left(p+\frac{1}{2}\right)\frac{\lambda}{\Delta N_{eff,TE-TM}}$$

in which equation, $p=n-m$ is an integer, $n_g$ is the group index ($n_g=N_{eff}-\lambda dN_{eff}/d\lambda$), $\Delta\lambda$ is the polarization dispersion ($\Delta\lambda=\lambda\Delta N_{eff}/N_{eff}$), and $\Delta N_{eff,TE-TM}$ is the birefringence ($\Delta N_{eff,TE-TM}=N_{eff,TE}-N_{eff,TM}$).

6. The integrated photonic component according to claim 5, wherein for matching the FSR of the MZI to the channel spacing of the AWG 1, $\Delta\lambda_{AWG}$, the length difference, $\Delta L$, between the first and the second waveguide arms of the MZI is given by:

$$\Delta L = \Delta L_{match} = \frac{\lambda_c^2}{n_g\Delta\lambda_{AWG}}$$

in which equation, $\lambda_c$ is the central channel wavelength of the AWG.

7. The integrated photonic component according to claim 6, wherein the first birefringence of the first waveguide arm of the MZI, $\Delta N_{eff,TE-TM,1}$, and the second birefringence of the second waveguide arm of the MZI, $\Delta N_{eff,TE-TM,2}$, are substantially the same and are given by:

$$\Delta N_{eff,TE-TM} = \left(p + \frac{1}{2}\right)\frac{\lambda_c}{\Delta L_{match}}$$

in which equation, p is an integer.

8. The integrated photonic component according to claim 7, wherein the integer p can be chosen such that the waveguides of the AWG and the polarization beam splitter have a width, W, of at least 2 micrometer.

9. The integrated photonic component according to claim 5, wherein each of the first and second waveguide arms of the MZI comprises at least one waveguide section, wherein the length difference, ΔL, is provided to one of said at least one waveguide sections of the first or the second waveguide arms.

10. The integrated photonic component according to claim 9, wherein the first waveguide arm of the MZI comprises at least a first and a second waveguide section, said at least first waveguide section having a third birefringence, $\Delta N_{eff,TE-TM,3}$, a third length, $L_3$, a first width, $W_1$, and a first height, $H_1$, and said at least second waveguide section having a fourth birefringence, $\Delta N_{eff,TE-TM,4}$, a fourth length, $L_4$, a second width, $W_2$, and a second height, $H_2$, wherein at least one of the first width and the first height is unequal to at least one of the second width and the second height such that the third birefringence and the fourth birefringence are unequal.

11. The integrated photonic component according to claim 10, wherein the second waveguide arm of the MZI comprises at least a third and a fourth waveguide section, said at least third waveguide section having a fifth birefringence, $\Delta N_{eff,TE-TM,5}$, a fifth length, $L_5$, a third width, $W_3$, and a third height, $H_3$, and said at least fourth waveguide section having a sixth birefringence, $\Delta N_{eff,TE-TM,6}$, a sixth length, $L_6$, a fourth width, $W_4$, and a fourth height, $H_4$, wherein at least one of the third width and the third height is unequal to at least one of the fourth width and the fourth height such that the fifth birefringence and the sixth birefringence are unequal.

12. The integrated photonic component according to claim 11, wherein the third and the fifth birefringences have a same first value, and the fourth and the sixth birefringences have a same second value, said first and second values being unequal.

13. The integrated photonic component according to claim 10, wherein the length difference, $\Delta L=L_1-L_2$, comprises at least a first part, $\Delta L_1$, and a second part, $\Delta L_2$, wherein either said at least first part, $\Delta L_1$, is provided to said at least first waveguide section and said at least second part, $\Delta L_2$, is provided to said at least second waveguide section of the first waveguide arm of the MZI, or wherein said at least first part, $\Delta L_1$, is provided to said at least third waveguide section and said at least second part, $\Delta L_2$, is provided to said at least fourth waveguide section of the second waveguide arm of the MZI.

14. The integrated photonic component according to claim 1, wherein at least one tuning element is provided to at least one of the first waveguide arm of the MZI and the second waveguide arm of the MZI for adjusting the effective mode index, $N_{eff}$, of at least one of the first and the second waveguide arms so as to improve an overlap of said passbands of the polarization splitting response of the MZI with said channels of the AWG.

15. The integrated photonic component according to claim 14, wherein said at least one tuning element is at least one of a thermal electrode, a reverse bias field-effect electrode, and a forward bias current-injection electrode.

16. The integrated photonic component according to claim 1, wherein the polarization splitting response is a sinusoidal function of wavelength of the optical signal.

17. The integrated photonic component according to claim 1, wherein the component is monolithically integrated on a semiconductor substrate comprising at least one of Indium Phosphide-based material and Silicon-based material, more particularly Silicon On Insulator.

18. The integrated photonic component according to claim 1, wherein the AWG and the polarization beam splitter have waveguides comprising at least one of Indium Phosphide, InP, Indium Gallium Arsenide Phosphide, InGaAsP, and Indium Aluminum Gallium Arsenide, InAlGaAs.

19. The integrated photonic component according to claim 1, wherein the component comprises at least one of Indium Phosphide, InP, Indium Gallium Arsenide Phosphide, InGaAsP, and Indium Aluminum Gallium Arsenide, InAlGaAs.

20. A photonic integrated circuit, PIC, for optical communication comprising the integrated photonic component according to claim 1.

* * * * *